US009398576B2

(12) United States Patent
Calcev et al.

(10) Patent No.: US 9,398,576 B2
(45) Date of Patent: Jul. 19, 2016

(54) SYSTEM AND METHOD FOR COMMUNICATIONS LINK CONTROL

(71) Applicant: FutureWei Technologies, Inc., Plano, TX (US)

(72) Inventors: George Calcev, Hoffman Estates, IL (US); Bin Chen, Schaumburg, IL (US); Lin Cai, Schaumburg, IL (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/681,093

(22) Filed: Nov. 19, 2012

(65) Prior Publication Data

US 2013/0128831 A1 May 23, 2013

Related U.S. Application Data

(60) Provisional application No. 61/561,707, filed on Nov. 18, 2011.

(51) Int. Cl.

*H04W 4/00* (2009.01)
*H04W 72/04* (2009.01)
*H04W 48/12* (2009.01)
*H04W 28/06* (2009.01)
*H04W 84/12* (2009.01)
*H04W 88/08* (2009.01)
*H04W 72/12* (2009.01)

(52) U.S. Cl.

CPC ............ *H04W 72/042* (2013.01); *H04W 48/12* (2013.01); *H04W 28/06* (2013.01); *H04W 72/1289* (2013.01); *H04W 84/12* (2013.01); *H04W 88/08* (2013.01); *Y02B 60/50* (2013.01)

(58) Field of Classification Search

CPC ............................ H04W 88/08; H04W 72/042
USPC .......................................................... 370/431
See application file for complete search history.

(56) References Cited

U.S. PATENT DOCUMENTS 6,934,299 B2 * 8/2005 Kaatz ............................ 370/459
7,366,103 B2 * 4/2008 Engwer et al. ................ 370/252

(Continued)

FOREIGN PATENT DOCUMENTS

CN 1716894 A 1/2006
CN 102711228 A 10/2012

(Continued)

OTHER PUBLICATIONS

International Search Report and Written Opinion of Patent Cooperation Treaty (PCT), International Application No. PCT/US12/65935, Applicant Huawei Technologies Co., Ltd., date of mailing Feb. 5, 2013, 7 pages.

(Continued)

*Primary Examiner* — Guang Li
(74) *Attorney, Agent, or Firm* — Slater Matsil, LLP

(57) ABSTRACT

A method for operating an access point includes identifying one or more stations to receive a transmission from the access point, and generating a traffic indicator map (TIM) for the one or more stations identified, the TIM in accordance with a TIM generating rule, the TIM identifying at least an offset length and a number of entries. The method further includes broadcasting a beacon carrying the TIM to the one or more stations identified, the one or more stations configured to decode the beacon according to the TIM generating rule.

28 Claims, 10 Drawing Sheets

(56) References Cited

U.S. PATENT DOCUMENTS

| | | | | |
|---|---|---|---|---|
| 7,650,559 | B2 * | 1/2010 | Nishibayashi et al. | 714/776 |
| 8,249,644 | B2 | 8/2012 | Taniuchi et al. | |
| 8,588,868 | B2 | 11/2013 | Miyata | |
| 9,078,210 | B2 * | 7/2015 | Yenganti | H04W 52/0206 |
| 9,137,823 | B1 * | 9/2015 | Liu | H04W 74/006 |
| 2003/0086443 | A1 | 5/2003 | Beach | |
| 2004/0246983 | A1 | 12/2004 | Kaatz | |
| 2005/0025092 | A1 | 2/2005 | Morioka et al. | |
| 2005/0220145 | A1 * | 10/2005 | Nishibayashi | 370/474 |
| 2005/0286454 | A1 | 12/2005 | Morimoto et al. | |
| 2006/0039345 | A1 | 2/2006 | Perez-Costa | |
| 2007/0297438 | A1 | 12/2007 | Meylan et al. | |
| 2008/0117851 | A1 | 5/2008 | Irie et al. | |
| 2008/0146253 | A1 | 6/2008 | Wentink | |
| 2008/0298290 | A1 * | 12/2008 | Wentink | H04W 52/0216 370/311 |
| 2009/0010191 | A1 * | 1/2009 | Wentink | H04W 52/0216 370/311 |
| 2009/0016306 | A1 * | 1/2009 | Wang et al. | 370/338 |
| 2011/0319073 | A1 * | 12/2011 | Ekici et al. | 455/426.1 |

FOREIGN PATENT DOCUMENTS

| | | | |
|---|---|---|---|
| JP | 2010130096 | A | 6/2010 |
| KR | 20060038388 | A | 5/2006 |
| RU | 2378779 | C2 | 1/2010 |
| RU | 2009101269 | A | 7/2010 |
| WO | 2005076543 | A1 | 8/2005 |
| WO | 2007144688 | A1 | 12/2007 |

OTHER PUBLICATIONS

"IEEE Standard for Information technology—Telecommunications and information exchange between systems—Local and metropolitan area networks—Specific requirements," IEEE Computer Society, IEEE Std 802.11™-2007 (Revision of IEEE Std 802.11-1999), Jun. 12, 2007, 1,233 pages.

Park, M., et al., "TGah TIM Element Improvements," Extend Submission, filename: 20111019r0-Intel-TIM-improvement, Intel Corp, Oct. 19, 2011, 14 pages.

Merlin, S., et al., "Efficient TIM signaling," Extend Submission, 20111031r0 Qualcomm Efficient TIM signaling, Oct. 31, 2011, 12 pages.

Japanese Office Action received in Application No. 2014-541520 mailed May 12, 2015, 7 pages.

Liu, et al., "Mid-CRC in Long Beacon," IEEE 802.11-12/1100r1, Sep. 2012, 5 pages.

Zheng, et al., "Low-Power PS-Poll," IEEE 802.11-12/0608r2, May 2012, 8 pages.

Decision on Grant received in Russian Application No. 2014124686/07 mailed Jul. 9, 2015, 16 pages.

Wentink, M., et al., "Lower Power Medium Access," doc: IEEE 802.11-12/0114r0, Jan. 16, 2012, 13 pages.

Calcev, G., et al., "Non-TIM Stations in 11ah," Doc: 11-12-0610-00-00ah, May 2012, 11 pages.

Yang, X., et al., "AID reassignment for TIM and non-TIM modes switching," doc: IEEE 802.11-12/891r0, Jul. 13, 2012, 9 pages.

International Search Report and Written Opinion of Patent Cooperation Treaty (PCT), International Application No. PCT/CN2012/083276, Applicant Huawei Technologies Co., Ltd., date of mailing Mar. 21, 2013, 11 pages.

Korean Office Action received in Application No. 10-2014-7015299 mailed Apr. 16, 2015, 10 pages.

Partial Supplementary European Search Report received in Application No. 12849267.5-1857, mailed Nov. 20, 2014, 7 pages.

Sthapit, Pranesh et al., "Effects of Radio Triggered Sensor MAC Protocol over Wireless Sensor Network," 11th IEEE International Conference on Computer and Information Technology, Aug. 31-Sep. 2, 2011, pp. 546-551.

* cited by examiner

640

660

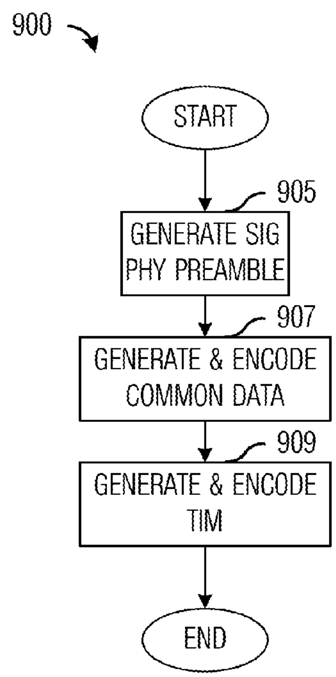
*Fig. 9a*
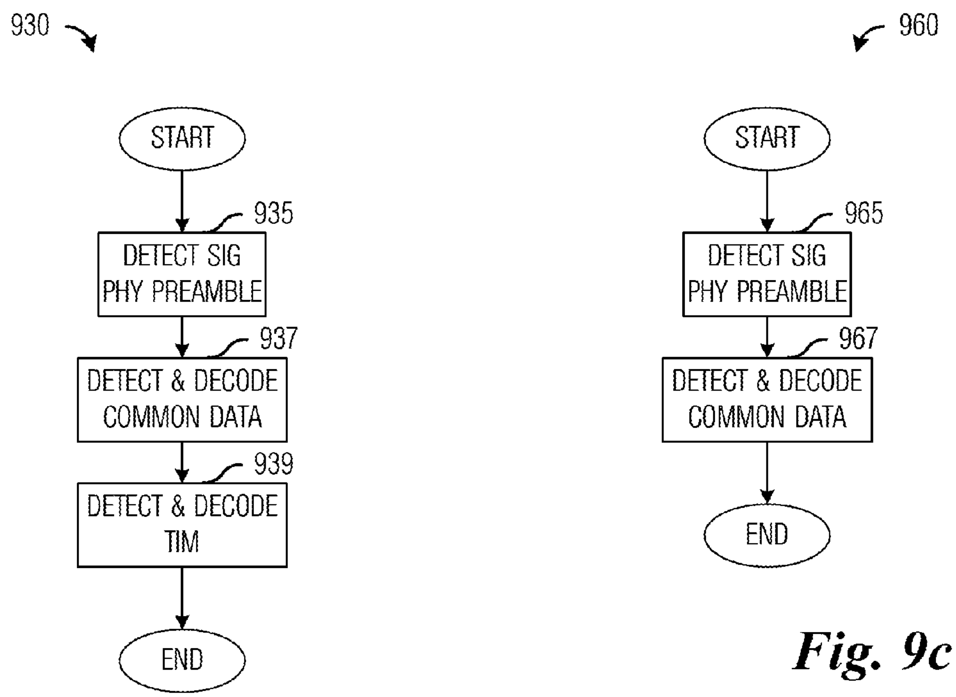
*Fig. 9c*
*Fig. 9b*

SYSTEM AND METHOD FOR COMMUNICATIONS LINK CONTROL

This application claims the benefit of U.S. Provisional Application No. 61/561,707, filed on Nov. 18, 2011, entitled "System and Method for Downlink and Uplink Control in WiFi Networks," which application is hereby incorporated herein by reference.

TECHNICAL FIELD

The present disclosure relates generally to digital communications, and more particularly to a system and method for communications link control.

BACKGROUND

In an IEEE 802.11 compliant communications system (also known as WiFi), an access point (AP) serves one or more stations (STA) by receiving transmissions from the one or more STA and forwarding the transmissions to their intended destinations. Similarly, the AP receives a transmission intended for one of its STA and forwards the transmission to the STA. A transmission occurs over unidirectional channels referred to as communications links. A transmission from a STA to the AP may be referred as an uplink (UL) transmission, while a transmission from the AP to a STA may be referred to as a downlink (DL) transmission.

FIG. 1 illustrates a portion of a prior art beacon 100. Beacon 100 is transmitted periodically by an AP and includes an element identifier (element ID) field 105, a length field 110, a delivery traffic indication map (DTIM) count field 115, a DTIM period field 120, a bitmap control field 125, and a partial virtual bitmap field 130. Element ID field 105, length field 110, DTIM count field 115, DTIM period field 120, and bitmap control field 125 contain information identifying and specifying a traffic indication map (TIM) bitmap contained in partial virtual bitmap field 130. The TIM bitmap is maintained by the AP or a mesh STA and consists of up to 2008 bits organized into 251 octets. An N-th bit ($0 \le N \le 2007$) in the TIM bitmap corresponds to bit number (N mod 8) in octet $\lfloor N/8 \rfloor$ where a low-order bit of each octet is bit number 0 and a high-order bit of each octet is bit number 7. Each bit in the TIM bitmap corresponds to traffic (data) buffered for a specific STA in a basic service set (BSS) that the AP is going to transmit at a time that beacon 100 is transmitted or a specific neighbor peer mesh STA within the mesh BSS (MBSS) that the mesh STA is going to transmit at a time that beacon 100 is transmitted.

The N-th bit in the TIM bitmap is set to "0" if there is no data (e.g., individually addressed MAC service data unit (MSDU) and/or MAC management protocol data unit (MMPDU)) for the STA corresponding to the N-th bit. If there are any individually addressed data, e.g., MSDU and/or MMPDU, for the STA corresponding to the N-th bit, then the N-th bit in the TIM bitmap is set to "1". It is noted that in legacy IEEE 802.11 systems, e.g., those that are compliant to IEEE 802.11 a, 802.11 g, 802.11 n, 802.11 ac, and the like, the maximum number of STAs in a BSS is 2007, so the TIM bitmap is capable of representing all STAs of a single BSS.

SUMMARY OF THE DISCLOSURE

Example embodiments of the present disclosure which provide a system and method for communications link control.

In accordance with an example embodiment of the present disclosure, a method for operating an access point is provided. The method includes identifying, by the access point, one or more stations to receive a first transmission from the access point. The method also includes generating, by the access point, a traffic indicator map (TIM) for the one or more stations identified in the TIM in accordance with a TIM generating rule, the TIM identifying at least an offset length and a number of entries. The method further includes broadcasting, by the access point, a beacon carrying the TIM to the one or more stations identified, the one or more stations configured to decode the beacon according to the TIM generating rule.

In accordance with another example embodiment of the present disclosure, a method for operating a station is provided. The method includes receiving, by the station, a first beacon including a traffic indicator map (TIM) from an access point, and identifying, by the station, one or more stations to receive a first transmission from the access point from the TIM in accordance with a TIM generating rule identifying at least an offset length and a number of entries. The method also includes determining, by the station, if the station is one of the one or more stations identified, and receiving, by the station, a second transmission from the access point if the station is one of the one or more stations identified.

In accordance with another example embodiment of the present disclosure, an access point is provided. The access point includes a processor, and a transmitter operatively coupled to the processor. The processor identifies one or more stations to receive a first transmission from the access point, and generates a traffic indicator map (TIM) for the one or more stations identified, the TIM in accordance with a TIM generating rule identifying at least an offset length and a number of entries. The transmitter broadcasts a beacon carrying the TIM to the one or more stations identified, the one or more stations configured to decode the beacon according to the TIM generating rule.

One advantage of an embodiment is that stations that do not receive any or very little traffic may not need to monitor for an indicator of such traffic, therefore, the stations may be able to sleep for extended periods of time. Hence, the power consumption of the stations may be reduced and the battery life of the stations may be increased.

A further advantage of an embodiment is that efficient techniques for TIM signaling are provided to help reduce TIM signaling overhead, which helps improve overall communications system performance.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 9*a* illustrates an example flow diagram of operations in an AP generating a beacon according to example embodiments described herein;

FIG. 9*b* illustrates an example flow diagram of operations in a TIM station receiving a beacon according to example embodiments described herein;

FIG. 9*c* illustrates an example flow diagram of operations in a non-TIM station receiving a beacon according to example embodiments described herein;

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to communications link control. For example, at an access point, the access point identifies one or more stations to receive a transmission from the access point, and generates a traffic indicator map (TIM) for the one or more stations identified in the TIM in accordance with a TIM generating rule identifying at least an offset length and a number of entries. The access point also broadcasts a beacon carrying the TIM to the one or more stations identified, the one or more stations configured to decode the beacon according to the TIM generating rule. As another example, at a station, the station receives a beacon including a traffic indicator map (TIM) from an access point, and identifies one or more stations to receive a transmission from the access point from the TIM in accordance with a TIM generating rule identifying at least an offset length and a number of entries. The station also determines if the station is one of the one or more stations identified, and receives a transmission from the access point if the station is one of the one or more stations identified.

The present disclosure will be described with respect to example embodiments in a specific context, namely downlink data transmissions in an IEEE 802.11 compliant communications system. The disclosure may also be applied, however, to uplink data transmissions in an IEEE 802.11 compliant communications systems, as well as uplink and/or downlink data transmissions in other standards compliant communications systems and non-standards compliant communications systems wherein an indicator of transmissions are presented to communications devices.

Figure 1:
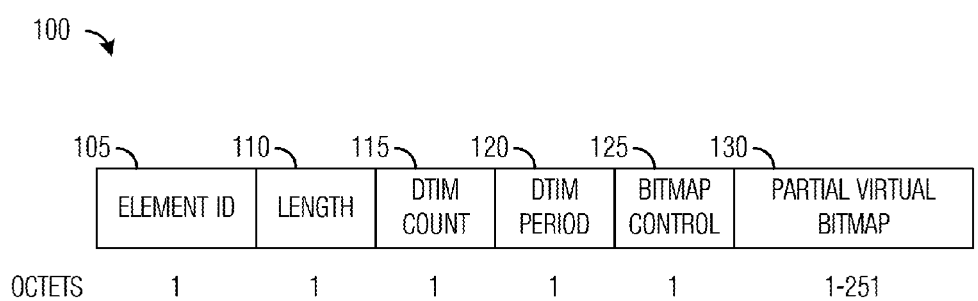
FIG. 1 illustrates a portion of a prior art beacon.
Figure 2A:
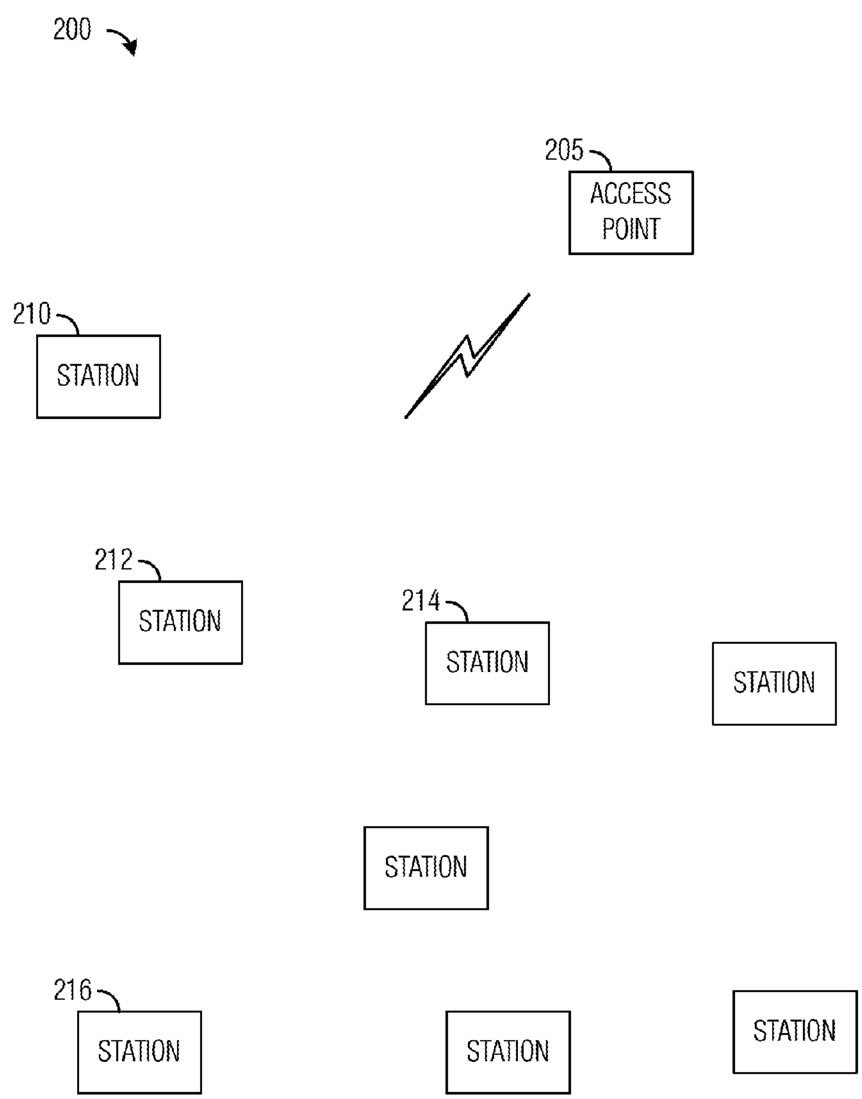
FIG. 2*a* illustrates an example communications system according to example embodiments described herein.

FIG. 2*a* illustrates a communications system 200. Communications system 200 includes an AP 205 that serves a plurality of stations, such as station 210, station 212, station 214, and station 216. AP 205 periodically transmits a beacon that includes a TIM bitmap to indicate which station AP 205 has buffered data for. The plurality of stations listen to the beacon, which includes detecting and decoding the beacon, and determines if it will be receiving a transmission from AP 205. If a station will be receiving a transmission from AP 205, then the station may remain awake to receive the transmission. If a station will not be receiving a transmission from AP 205, then the station may go to sleep or perform some other operation.

Recently, a new task group, TGah, has been formed to prepare specifications for under 1 GHz WiFi. The 1 GHz WiFi as specified by TGah is mainly targeted towards sensor networks with traffic offloading from cellular networks being a secondary usage scenario. A requirement for the specifications is to support more than 6000 stations. The 1 GHz WiFi will operate in a narrow bandwidth (between 1 and 2 MHz) achieved by downclocking 20 MHz WiFi implementations. However, this naturally leads to an increased length in the symbol duration from 4 us in 20 MHz to 40 us in 2 MHz.

Figure 2B:
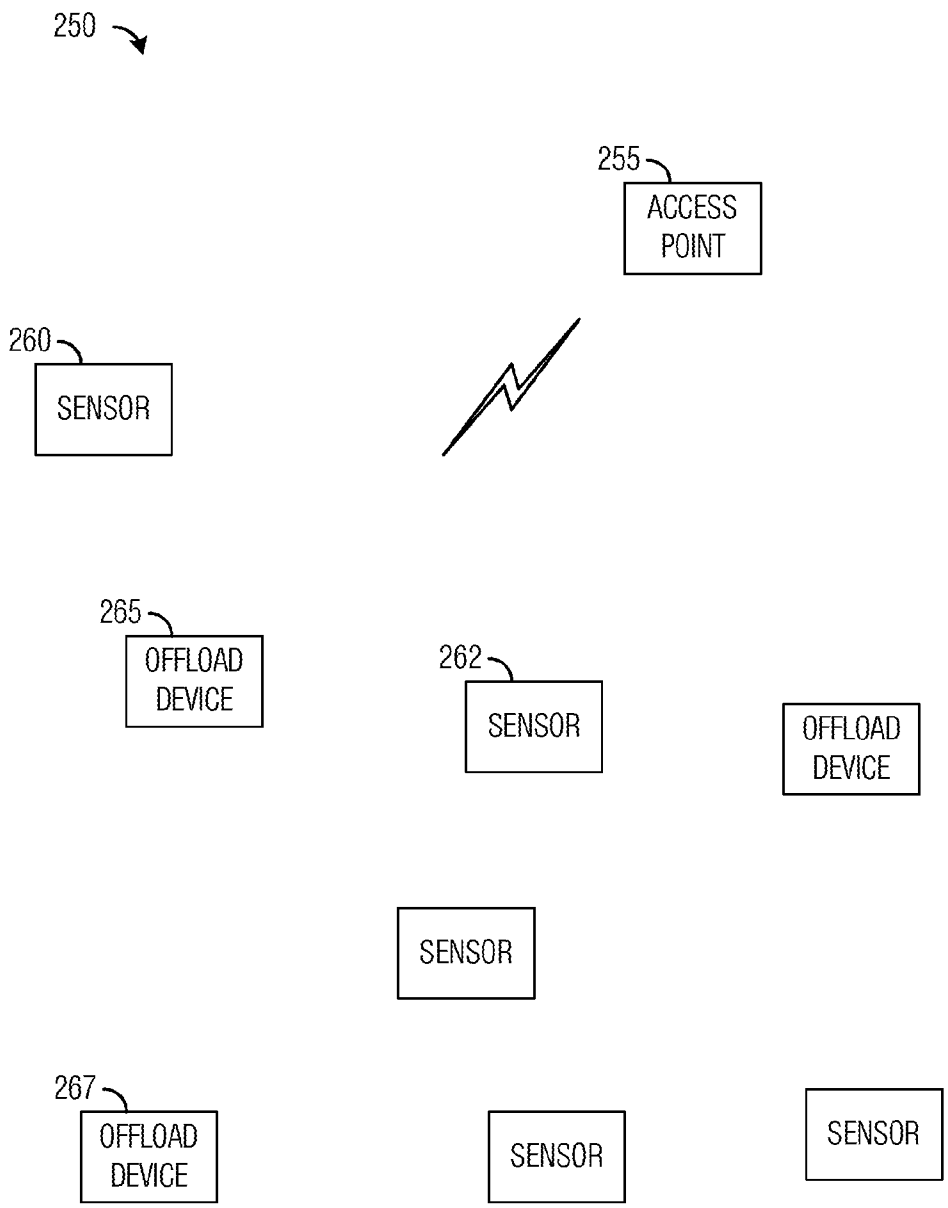
FIG. 2*b* illustrates an example communications system, wherein the communications system includes sensor devices and traffic offloading devices

FIG. 2*b* illustrates a communications system 250, wherein communications system 250 includes sensor devices and traffic offloading devices. Communications system 250 may be compliant to the 1 GHz WiFi as specified by TGah. Communications system 250 includes an AP 255 serving a plurality of sensor devices, such as sensor 260 and sensor 262, as well as a plurality of traffic offloading devices, such as offload device 265 and offload device 267. AP 255 may periodically transmit a beacon including a TIM bitmap to indicate to the devices served by AP 255, e.g., the sensor devices and the traffic offloading devices, as well as other types of devices, which of them AP 255 will be transmitting downlink data to. It is noted that communications system 250 may also include other communications devices, such as computers, tablets, telephones, printers, televisions, relays, and the like. However, for simplicity reasons, communications system 250 is shown as including one AP, five sensor devices, and three offload devices.

However, sensor devices generally make their measurements and transmit the measurements to an information aggregator via AP 255 and typically do not receive any or very little downlink data. In other words, sensor devices predominantly make UL transmissions while receiving very few or no DL transmissions. Hence, for a majority of the time, bits in the TIM bitmap corresponding to the sensor devices may likely be set to "0" or without downlink data.

Traffic offloading devices, as well as other devices, such as user equipment (UE), smart phones, computers, tablets, and the like, predominantly receive DL transmissions while typically making a smaller number of UL transmissions. Therefore, there is high probability that bits in the TIM bitmap corresponding to offloading devices will be set to "1" or with downlink data.

Additionally, since sensor devices are usually battery powered, power consumption is another important consideration in sensor networks. Any additional overhead, such as communications overhead, would lead to a shorter battery life, which implies additional costs involved in battery replacement. As an example, if a TIM bitmap was used in the 1 GHz WiFi as specified by TGah, the TIM bitmap would be at least 6000 bits long (with 1 bit per station) and a beacon including the TIM bitmap would be longer than 40 ms long. A sensor actively receiving a 40 ms transmission would consume a large amount of energy, thereby significantly shortening its battery life. Therefore, it may be desirable to not require sensor devices, as well as other devices that have very little or no downlink data, to detect and decode the TIM bitmap, which can result in a significant reduction in power consumption. The sensor devices may be characterized by low duty cycle traffic. Between transmissions they may conserve the energy by switching to a sleep or suspend mode. Sensor devices wake up for UL transmissions.

It is noted that although the discussion focuses on downlink data and TIM bitmaps for downlink transmissions, the example embodiments presented herein are also operable for uplink data and TIM bitmaps for uplink transmissions. Therefore, the discussion of downlink data and TIM bitmaps for downlink transmissions should not be construed as being limiting to either the scope or the spirit of the example embodiments.

According to an example embodiment, stations in a communications system may be categorized into one of two types according to their TIM status, i.e., their use or non-use of the TIM bitmap for downlink data and/or uplink data signaling. A first station type may be referred to as a TIM station (or simply TIM-needed station), which includes stations that make use of the TIM bitmap for downlink data and/or uplink data signaling. Examples of TIM stations may include traffic offloading devices, UEs, computers, tablets, and the like. A second station type may be referred to as a non-TIM station (or simply TIM-unneeded station), which includes stations that do not use the TIM bitmap for downlink data and/or uplink data signaling. Examples of non-TIM devices include sensor devices, as well as other devices that have little or no downlink data and/or uplink data. Tables 1 and 2 present summaries of station types for downlink data and uplink data signaling where an X represents a situation where any value is ok.

TABLE 1

Summary of Station Types for Downlink Data Signaling

| Station Type | Uplink Data | Downlink Data |
|---|---|---|
| TIM | YES | YES |
| Non-TIM | X | NO/Little |

As shown in Table 1, a station may be classified as a non-TIM station when it has little or no downlink data. Additionally, a station may be classified as non-TIM station if its downlink data can tolerate a relatively large delay and therefore it can be requested by the station from the AP at arbitrary time.

Since there are a number of types of stations, e.g., TIM and non-TIM, a separation in AID address space for the different types of stations may be beneficial. Separation of the AID address space may simplify identification and AID allocation for a station. As an example, if a station has an AID location in a particular region of the AID address space, the station's type is readily known. It is noted that the discussion presented below focuses on separating the AID address space into two regions. However, the AID address space may be separated into any number of regions to meet the number of types of stations.

Figure 3A:
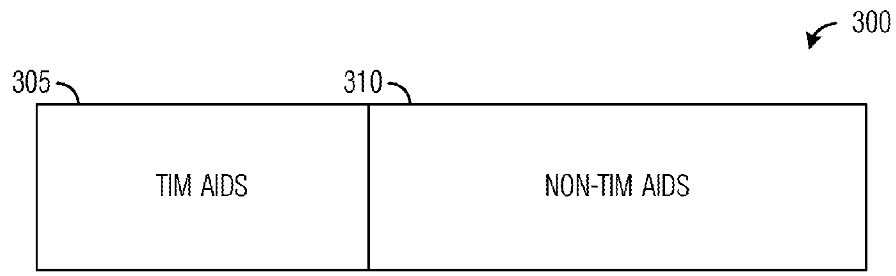
FIG. 3*a* illustrates an example diagram of an AID address space with a hard separation according to example embodiments described herein.

According to an example embodiment, the separation of the AID address space may be a hard separation wherein predefined numbers of AIDs are reserved for different types of stations. In other words, a certain number of AIDs are reserved for the TIM devices. The number can be pre-defined, or by negotiation, or determined by the AP and broadcast to the BSS via beacon or some other messages. As an example, the number of AIDs reserved for TIM devices may be fixed. With the number of AIDs fixed, the size of the TIM may also be fixed. FIG. 3*a* illustrates a diagram of an AID address space 300 with a hard separation. As shown in FIG. 3*a*, AID address space 300 is separated into a TIM AIDs space 305 and a non-TIM AIDs space 310. AIDs for stations may be taken from an appropriate AIDs space depending on the type of the station. It is noted that since the separation is a hard separation, the number of AIDs available per type of station is fixed.

Figure 3B:
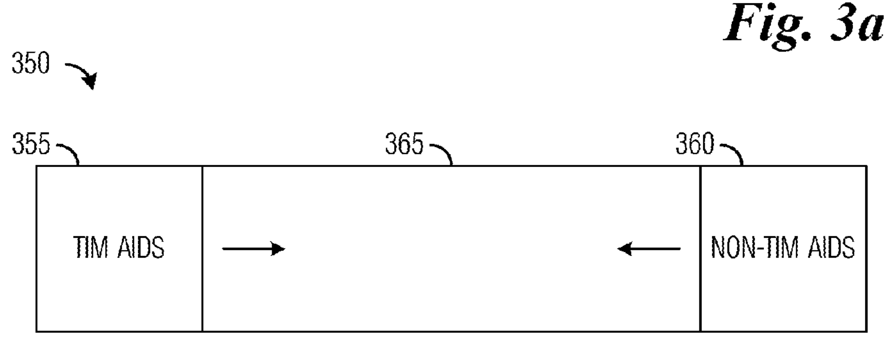
FIG. 3*b* illustrates an example diagram of an AID address space with a soft separation according to example embodiments described herein.

According to another example embodiment, the separation of the AID address space may be a soft separation where AIDs for a first type of station may begin at a first specified part of the AID address space, while AIDs for a second type of station may begin at a second specified part of the AID address space. As an example, AIDs for non-TIM stations are allocated from the high address place of the AID space and the AIDs for TIM stations are allocated from the low address place of the AID address space. With the number of AIDs potentially being variable, the size of the representation of the TIM may also be variable. FIG. 3*b* illustrates a diagram of an AID address space 350 with a soft separation. As shown in FIG. 3*b*, AID address space 350 includes a TIM AIDs space 355 and a non-TIM AIDs space 360. AID address space also includes an unassigned region 365 that includes AIDs that may be assigned to either TIM stations or non-TIM stations. As AIDs are assigned, the respective AIDs space grows. As an example, as AIDs are assigned to TIM stations, TIM AIDs space 355 grows to the right, while as AIDs are assigned to non-TIM stations, non-TIM AIDs space 360 grows to the left. It is noted that since the separation is a soft separation, the number of AIDs available for a particular type of station is limited only by a total AID address space and a number of the other types of stations.

Figure 4:
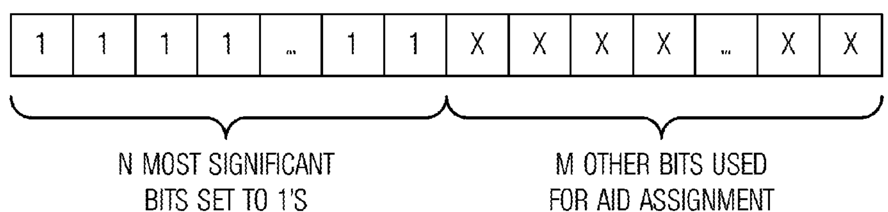
FIG. 4 illustrates an example TIM station's AID according to example embodiments described herein.
Figure 5:
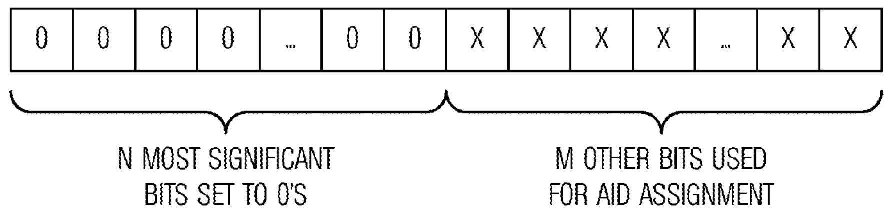
FIG. 5 illustrates an example non-TIM station's AID according to example embodiments described herein.

According to another example embodiment, AID allocation for TIM and non-TIM stations may use different AID address definitions. In order to distinguish them from some other messages that also use AIDs to identify stations, there may be a specific value, e.g., a sequence of bits, in the AID. As an example, both types of stations' AIDs have the same length, e.g., 13 or 14 bits, but for the TIM stations (or non-TIM stations), a specified number of most significant bits shall be set as all 1 or 0 (the specified number could be pre-defined or configured during communication or broadcast to the BSS via messages, e.g., a beacon), and the same position of non-TIM stations respectively (or TIM stations respectively) AIDs cannot be set as all 1 or 0 respectively, while the other bits are used for AID assignment. As another example, the AID is 14 bytes in length, and the most significant 7 bits of TIM stations' AIDs are set to all 1 or 0, and the other bits can be used for AID assignment, so the TIM stations AID has the form as shown FIGS. 4 and FIG. 5 illustrates a non-TIM station's AID.

The AP may broadcast the information regarding the number of most significant bits set to all 1 or 0 via a beacon. For the indicators in the TIM, the AP may use the 2ˆ7 values (the 7 remaining bits of out the 14 bit long AID) to represent the TIM stations, and each bit in the TIM indicating the corresponding AID assigned by the 7 remaining bits.

With more than two types of stations, a combination of soft separation and fixed separation may be possible. As an example, fixed separation may be used to specify AIDs for a first and a second type of station, while soft separation may be used for a third and a fourth type of station.

Although in some implementations, such as IEEE 802.11ah, a single AP may support a large number of stations, it is expected that an actual number of TIM stations, such as traffic offloading devices, in the communications system to be relatively small due to capacity limits in the communications system. According to an example embodiment, the TIM may be generated adaptively to reflect the stations that will actually be receiving transmissions. It may be advantageous for the AP to indicate only the stations that will be receiving a transmission from the AP instead of transmitting the TIM bitmap which includes indications for every station in the AID address space. Indicating only the stations that have downlink data may reduce the length of the TIM, thereby reducing signaling overhead and increasing overall communications system efficiency.

As an example, the compressed representation of the TIM may be generated adaptively using a compression TIM generating rule that is known by both the AP and the stations. The TIM generating rule may specify a format of a TIM. As an example, the TIM generating rule may specify fields in the TIM, size of the fields, representation of information in the fields, and the like. The TIM generating rule may be used by the AP to generate the compressed representation of the TIM and the same TIM generating rule or a corresponding TIM decomposition rule may be used by stations to extract information from the compressed representation of the TIM. The AP may signal to the stations which TIM generation rule that it is using to generate the TIM. As an example, the AP may signal the TIM generation rule to a station when the station associates with the AP. As another example, the AP may signal the TIM generation rule that it will use to generate a TIM for a subsequent transmission opportunity when it is broadcasting a TIM for a current transmission opportunity. As another example, the AP may signal the TIM generation rule periodically, at specified time instances, occurrence of an event (an addition of a new station, a removal of an old station, and the like) or upon receipt of an instruction. It is noted that the AP may signal an indication of the TIM generation rule, e.g., an index to a list of TIM generation rules, which may represent the TIM generation rule rather than signal the actual TIM generation rule.

Figure 6A:
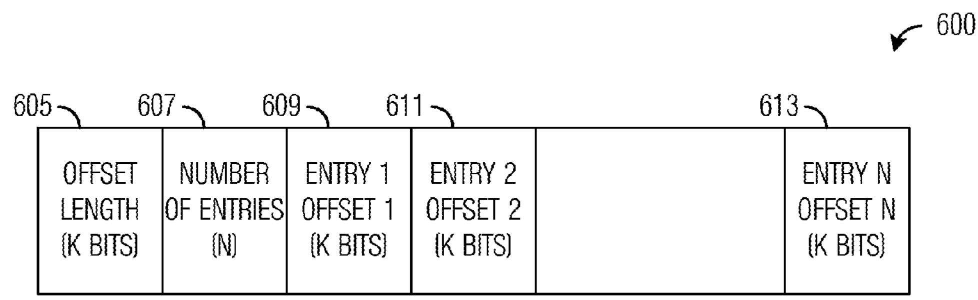
FIG. 6*a* illustrates an example TIM that indicates stations receiving a transmission by an AP, the TIM is generated according to a first TIM generation rule according to example embodiments described herein.

FIG. 6*a* illustrates a TIM 600 that indicates stations receiving a transmission by an AP, TIM 600 is generated according to a first compressed TIM generation rule. According to an example embodiment, the first TIM generating rule utilizes offsets between a reference AID (e.g. AID=0 corresponding to bit position zero) in the uncompressed TIM bitmap and the AID bit position in the uncompressed TIM bitmap of stations receiving transmissions. Practically, the offset represents the distance expressed as a number of bits in the uncompressed TIM bitmap between the reference AID and the bit corresponding to the AID of the station that has data available at the AP. Each offset is referenced to the reference AID. TIM 600 may include an offset length field 605 that indicates a number of bits used to represent an offset from a reference AID to an AID of a station that is to receive a transmission from an AP. As an example, if an offset is a decimal 126, then the offset length must be at least 7 bits long to represent the decimal 126. While, if an offset is a decimal 65, then the offset length must be at least 7 bits long to represent the decimal 65. In addition to offset length field 605, TIM 600 may include a number of entries field 607 that indicates a number of entries (e.g., a number of stations receiving transmissions) in TIM 600. TIM 600 may then include a specified number of entries (as specified in number of entries field 607). As an example, TIM 600 includes N entries, such as entry 1 609, entry 2 611, and entry N 613. A general expression for the length of a TIM generated with the first TIM generating rule is expressible as:

$$\text{bits}=N[\log_2(K)]+[\log_2(N)]+\log_2(\text{MaxTIMbitmap length}),$$

where K is the offset length, and N is the number of entries and [.] operation denotes rounding up to the next integer.

As an illustrative example, consider the following configuration:

Offset length field 605: 4 bits, capable of representing a maximum offset length of 13 bits;

Number of entries field 607: 13 bits, capable of representing $2^{13}$ stations;

For discussion purposes, let there be 512 registered stations that need to utilize the TIM. Therefore, a TIM bitmap is 512 bits long. Out of the 512 registered stations, only 20 will be receiving a transmission from the AP. Therefore, the offset length will be 9 bits (9 bits are required to represent 512 values), i.e., offset length field 605 will be 1001. Furthermore, number of entries field 607 will be 00000010100 (binary for 20). Each entry (e.g., entry 1 609, entry 2 611, and the like) will be 9 bits, therefore, all 20 entries will require 180 bits. Hence, a TIM generated according to the first TIM generating rule will be (4+12+180) bits=196 bits (compared to 512 bits for a TIM bitmap).

Figure 6B:
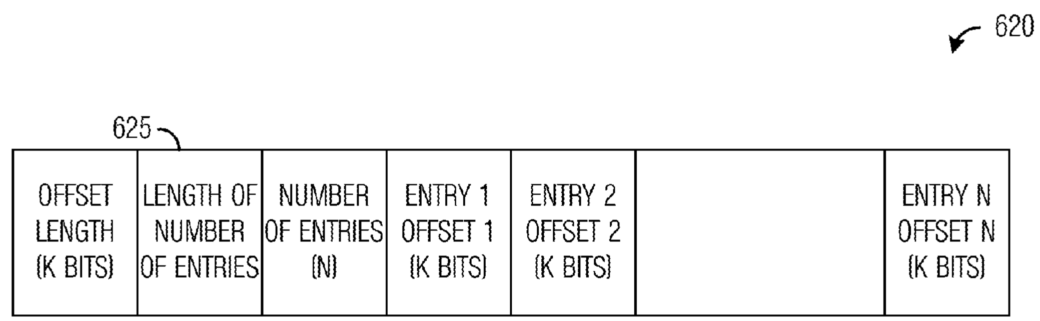
FIG. 6*b* illustrates an example TIM that indicates stations receiving a transmission by an AP, the TIM is generated according to a modification of the first TIM generation rule according to example embodiments described herein.

It is noted that additional savings may be achieved if the entries are encoded in a variable number of bits. FIG. 6*b* illustrates a TIM 620 that indicates stations receiving a transmission by an AP, TIM 620 is generated according to a modification of the first TIM generation rule. Comparing TIM 620 to TIM 600, an additional field is added. A length of number of entries field 625 is added to support a different field size for the number of entries field. Utilizing the same conditions as presented for the above illustrative example and 4 bits for length of number of entries field 625, a TIM generated according to the modified first TIM generation rule will be (4+4+5+180)=194 bits.

Figure 6C:
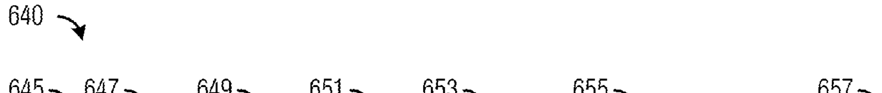
FIG. 6*c* illustrates an example TIM that indicates stations receiving a transmission by an AP, the TIM is generated according to a second TIM generation rule according to example embodiments described herein.

FIG. 6*c* illustrates a TIM 640 that indicates stations receiving a transmission by an AP, TIM 640 is generated according to a second TIM generation rule. According to an example embodiment, the second TIM generating rule utilizes differences between consecutive AIDs of stations receiving transmissions. TIM 640 may include an offset length field 645 that indicates a number of bits used to represent an offset from a reference AID to an AID of a first station that is to receive a transmission from an AP. As an example, if an offset is a decimal 126, then the offset length must be at least 7 bits long to represent the decimal 126. While, if an offset is a decimal 65, then the offset length must be at least 7 bits long to represent the decimal 65. In addition to offset length field 645, TIM 640 may include a number of entries field 647 that indicates a number of entries (e.g., a number of stations in addition to the first station receiving transmissions) in TIM 640. Hence, if there are a total of 5 stations receiving transmissions, the number of entries will be 4.

TIM 640 may also include an increment size field 649 that indicates a number of bits used to represent an increment between AIDs of adjacent stations receiving transmissions. In other words, instead of representing the offsets with respect to a fixed AID position (i.e., the reference AID) in the uncompressed TIM bitmap, the increments represent the distance in bits between consecutive AID entries of stations with data in the uncompressed TIM bitmap. As an example, if a maximum difference between AIDs of adjacent stations is 12, then a smallest increment that is capable of representing 12 is 4 bits, so increment size field 649 may indicate 4 bits for the increment size, while if a maximum difference between AIDs of adjacent stations is 34, then a smallest increment that is capable of representing 34 is 6 bits, so increment size field 649 may indicate 6 bits for the increment size. TIM 640 may also include an offset field 651 that includes an offset from a reference AID to an AID of the first station that is to receive a transmission from the AP. TIM 640 may also include a specified number of entries (as specified in number of entries field 647). As an example, TIM 640 includes N entries, such as entry 1 653, entry 2 655, and entry N 657. As an illustrative example, consider the following situation: Number of stations=512, AIDs of stations receiving transmissions: 300, 332, 364, 380, and 384. The offset length is then 9 bits (to represent the offset of 300), hence offset length field requires 4 bits. Therefore, the maximum increment is 32, thereby requiring at least 5 bits (however, 8 bits are used in this illustrative example). N is equal to 4, therefore at least 2 bits are required (however, 4 bits are used in this illustrative example). The entries are: 32, 32, 16, and 4, which require at least 5 bits to represent or a total of 20 bits for all four entries. Hence, the total number of bits for a TIM generated according to the second TIM generating rule is (4+4+8+9+20)=45 bits.

Figure 6D:
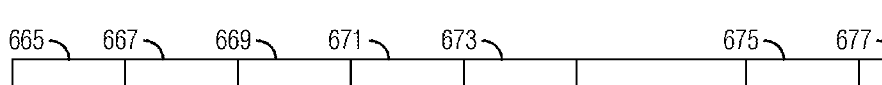
FIG. 6*d* illustrates an example TIM that indicates stations receiving a transmission by an AP, the TIM is generated according to a third TIM generation rule according to example embodiments described herein.

FIG. 6*d* illustrates a TIM 660 that indicates stations receiving a transmission by an AP, TIM 660 is generated according to a third TIM generation rule. According to an example embodiment, the third generating rule utilizes a mixed format that lends itself to situations with clustered AIDs. The third TIM generating rule utilizes offsets between a reference AID (e.g., AID 0) and an initial AID of a cluster of stations and then includes a TIM bitmap of the stations in the cluster. Each offset is referenced to the reference AID. TIM 660 may include an offset length field 665 that indicates a number of bits used to represent an offset from a reference AID to an AID of an initial station of a cluster of stations that is to receive a transmission from an AP. In addition to offset length field 665, TIM 660 may include a number of entries field 667 that indicates a number of entries (e.g., a number of clusters of stations receiving transmissions) in TIM 660. Additionally, TIM 660 may include a bitmap size field 669 that indicates a length of a bitmap, which corresponds to a number of stations in a cluster. TIM 660 may then include a specified number of entries (as specified in number of entries field 667). As an example, TIM 660 includes N entries, such as entry 1 671 followed by bitmap 1 673, and entry N 675 followed by bitmap N 677As an illustrative example, consider the following situations: Number of stations=512, AIDs of stations receiving transmissions: 34, 40, 41, 42, 43, 300, 303, 304, 308, and 315. Offset length is then 9 bits (encoded into 4 bits), while the length of entries is encoded into 4 bits and number of entries is represented using 3 bits. Additionally, the bitmap size is represented by 6 bits (i.e., bitmaps are less than 64 bits long). Then, offset 1=34 and bitmap 1=1000001111000000, and offset 2=300 and bitmap 2=1001100010000001. Hence, the total number of bits for a TIM generated according to the third TIM generating rule is (4+4+3+6+2(9+16)=65 bits.

It is noted that the third TIM generating rule, which makes use of offsets between a reference AID and an initial AID of a cluster of stations may be readily modified to utilize increments between adjacent clusters of stations in a manner similar to the second TIM generating rule.

Figure 7A:
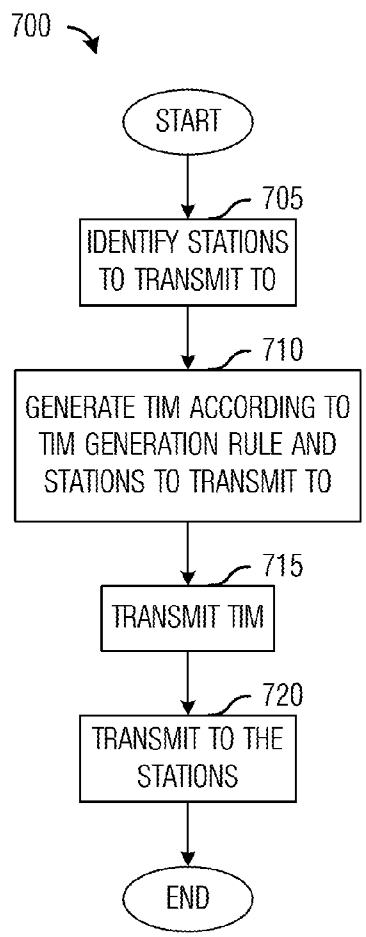
FIG. 7*a* illustrates an example flow diagram of operations in an AP as the AP transmits to stations according to example embodiments described herein.

FIG. 7*a* illustrates a flow diagram of operations 700 in an AP as the AP transmits to stations. Operations 700 may be indicative of operations occurring in an AP, such as AP 255, as the AP transmits to stations, wherein the AP utilizes a TIM generated according to a TIM generating rule.

Operations 700 may begin with the AP identifying stations that it is transmitting to (block 705). In general, the AP may be serving a number of stations, however, in any given transmission opportunity, such as a TTI, the AP may only transmit to a subset of the stations that it is serving. Instead of transmitting to all of the served stations, the AP may transmit to only a subset due to a number of factors, including: the AP may only have data to transmit to some of the served stations, the AP may select the subset of stations according to a selection criteria, such as fairness, priority, quality of service requirements, service history, subscriber level, and the like, network utilization, network load, availability of data, and the like. As an example, the AP may determine the AIDs of the stations.

The AP may generate a TIM according to the stations identified as stations that the AP is transmitting to and a TIM generating rule (block 710). As an example, the AP may use the AIDs of the stations in conjunction with the TIM generating rule, e.g., one of the TIM generating rules described herein, to generate a TIM. The AP may broadcast the TIM in a beacon that may be heard by the stations served by the AP (block 715). It is noted that although the AP is broadcasting the TIM (in the beacon) to all of its served stations, some of the stations served by the AP, e.g., the non-TIM stations, may ignore some or part of the beacon. The AP may transmit to the stations that it identified in block 705 (block 720).

Figure 7B:
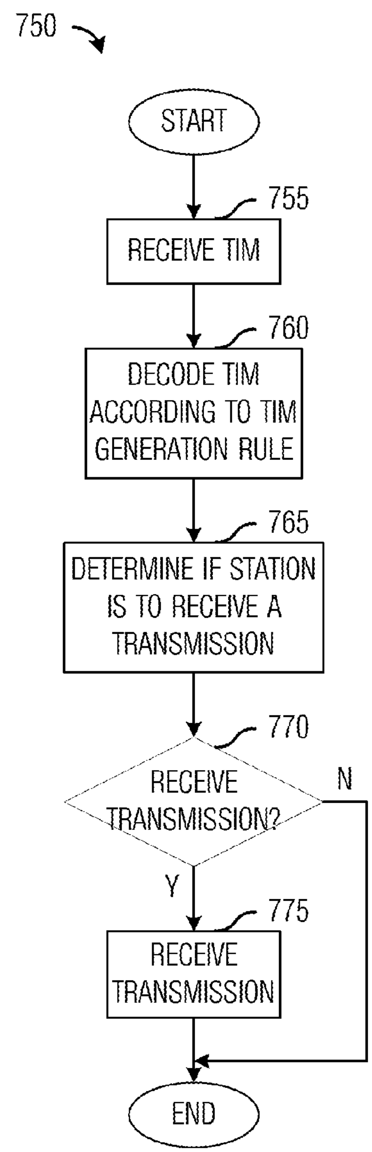
FIG. 7*b* illustrates an example flow diagram of operations in a station as the station receives a transmission from an AP according to example embodiments described herein.

FIG. 7*b* illustrates a flow diagram of operations 750 in a station as the station receives a transmission from an AP. Operations 750 may be indicative of operations occurring in a station, such as offload device 265 and offload device 267, as the station receives a transmission from an AP.

Operations 750 may begin with the station receiving a TIM broadcast in a beacon by the AP (block 755). The station may decode the TIM in accordance with a TIM generating rule as specified by the AP (block 760). The AP may have informed the station of the TIM generating rule that it is using to generate the TIM when the station associated with the AP. The AP may have alternatively informed the station of the TIM generating rule in a transmission, such as in a previously broadcast beacon or message.

With the TIM decoded, the station may determine if it is one of the stations indicated in the TIM as receiving a transmission from the AP (block 765). If the station is to receive a transmission from the AP (block 770), then the station will receive a transmission from the AP (block 775). If the station is not to receive a transmission from the AP (block 770), then the station may resume its normal operations or go into a sleep or suspend mode.

Figure 8A:
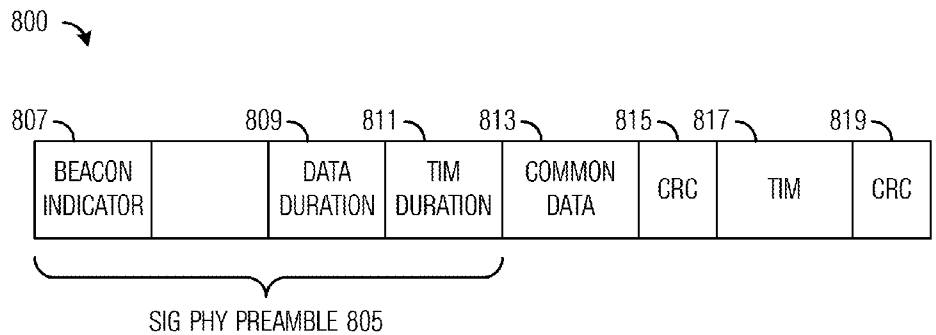
FIGS. 8*a* through 8*c* illustrate example beacons for supporting multiple station types according to example embodiments described herein.
Figure 8B:
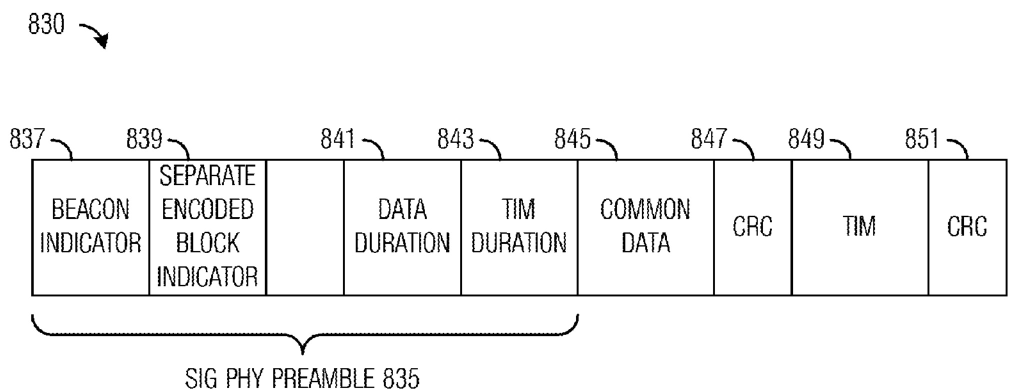
Figure 8C:
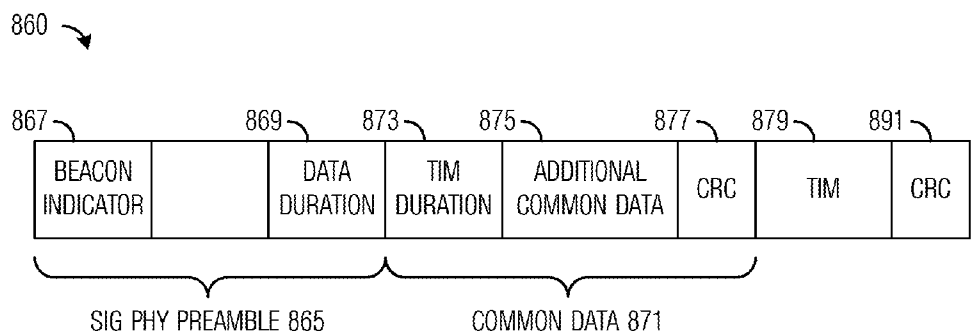

FIG. 8*a* illustrates a first beacon 800 for supporting multiple station types. According to an example embodiment, in order to support multiple station types, a beacon may include a separate common data area and a separate TIM area. Furthermore, the common data area and the TIM area should be encoded separately so that a station that is not interested in the TIM area does not need to detect and decode the TIM area in order to detect and decode the common area. First beacon 800 includes a signal (SIG) physical layer (PHY) preamble 805 that may include a beacon indicator 807, which may be a one or more bit indicator indicating that a beacon is being transmitted. SIG PHY preamble 805 may also include a data duration field 809 that indicates a duration (e.g., in time or symbols) of a common data area of first beacon 800 and a TIM duration field 811 that indicates a duration (e.g., in time or symbols) of a TIM area of first beacon 800.

First beacon 800 also includes a common data area comprising a common data field 813 and a cyclic redundancy check (CRC) field 815 for common data field 813, and a TIM area comprising a TIM bitmap 817 and a CRC field 819 for TIM bitmap 817. As discussed above, the duration of common data field 813 may be specified by data duration field 809, while TIM duration field 811 may specify the duration of TIM bitmap 817. Additionally, common data field 813 and TIM bitmap 817 may be separately encoded so that a station that is not interested in the TIM bitmap may not need to detect and decode TIM bitmap 817 in order to detect and decode common data field 813.

FIG. **8*b* illustrates a second beacon 830 for supporting multiple station types. Second beacon 830 includes a SIG PHY preamble 835 that may include a beacon indicator 837 to indicate that a beacon is being transmitted, and a separate encoded block indicator 839 to indicate that second beacon 830 includes more than one block of separately encoded information. It is noted that beacon indicator 837 may be used in place of separate encoded block indicator 839 meaning that beacon indicator 837 may indicate both a beacon being transmitted and that the beacon includes more than one block of separately encoded information. SIG PHY preamble 835 may also include a data duration field 841 that indicates a duration (e.g., in time or symbols) of a common data area of second beacon 830 and a TIM duration field 843 that indicates a duration (e.g., in time or symbols) of a TIM area of second beacon 830**.

Second beacon 830 also includes a common data area comprising a common data field 845 and a CRC field 847 for common data field 845, and a TIM area comprising a TIM bitmap 849 and a CRC field 851 for TIM bitmap 849. As discussed above, the duration of common data field 845 may be specified by data duration field 841, while TIM duration field 843 may specify the duration of TIM bitmap 849. Additionally, common data field 845 and TIM bitmap 849 may be separately encoded so that a station that is not interested in the TIM bitmap may not need to detect and decode TIM bitmap 849 in order to detect and decode common data field 845.

FIG. **8*c* illustrates a third beacon 860 for supporting multiple station types. Third beacon 860 includes a SIG PHY preamble 865 that may include a beacon indicator 867 to indicate that a beacon is being transmitted. SIG PHY preamble 865 may also include a data duration field 869 that indicates a duration (e.g., in time or symbols) of a common data area of third beacon 860**.

Third beacon 860 also includes a common data area 871 comprising a TIM duration field 873 that indicates a duration (e.g., in time or symbols) of a TIM area of third beacon 860. Common data area 871 also includes an additional data field 875 and a CRC field 877 for common data field 871, and a TIM area comprising a TIM bitmap 879 and a CRC field 881 for TIM bitmap 879. With third beacon 860, non-TIM stations may detect and decode just common data area 871 using data duration field 869, while TIM stations may detect and decode the TIM area using TIM duration field 873 in common data area 871.

According to an alternative example embodiment, a beacon may not include a TIM area. The beacon may just include a common data area and a corresponding TIM area may be transmitted in a separate message, which may be another beacon or a non-beacon transmission. The corresponding TIM area may or may not be periodic in nature and may be transmitted adaptively based on traffic, e.g., downlink traffic, patterns or provided upon request from a station(s).

As discussed above, the duration of common data field 845 may be specified by data duration field 841, while TIM duration field 843 may specify the duration of TIM bitmap 849. Additionally, common data field 845 and TIM bitmap 849 may be separately encoded so that a station that is not interested in the TIM bitmap may not need to detect and decode TIM bitmap 849 in order to detect and decode common data field 845.

FIG. **9*a* illustrates a flow diagram of operations 900 in an AP generating a beacon. Operations 900 may be indicative of operations occurring in an AP, such as AP 255**, generates a beacon. The beacon generated by the AP includes support for TIM and non-TIM station operation.

Operations 900 may begin with the AP generating a SIG PHY preamble for the beacon (block 905). The SIG PHY preamble may include a beacon indicator and/or a separate encoded block indicator. The SIG PHY preamble may also include data duration information. Depending on the beacon, the SIG PHY preamble may further include TIM duration information.

The AP may generate and encode information to be included in the common data portion of the preamble, which may be detected and decoded by both TIM and non-TIM stations (block 907). If the common data portion of the preamble also includes TIM duration information, the AP may place such information in the common data portion. The AP may generate a CRC for the common data portion of the preamble. The AP may generate and encode information to be included in the TIM portion of the preamble, which may be detected and decoded by TIM stations (block 909). The AP may generate a CRC for the TIM portion of the preamble. The AP may transmit the preamble.

FIG. **9*b* illustrates a flow diagram of operations 930 in a TIM station receiving a beacon. Operations 930 may be indicative of operations occurring in a TIM station, such as an offload device 265 and offload device 267**, as the TIM station receives a beacon.

Operations 930 may begin with the TIM station detecting a SIG PHY preamble of the beacon (block 935). The SIG PHY preamble may include, depending on beacon configuration: a beacon indicator, a separate encoded block indicator, data duration information, TIM duration information, common data, a TIM bitmap, or a combination thereof. The TIM station may detect and decode the common data part of the beacon (block 937). Since the TIM station needs information in the TIM bitmap, the TIM station may also detect and decode the TIM part of the beacon (block 939).

FIG. **9*c* illustrates a flow diagram of operations 960 in a non-TIM station receiving a beacon. Operations 960 may be indicative of operations occurring in a non-TIM station, such as sensor 260, and sensor 262**, as the non-TIM station receives a beacon.

Operations 960 may begin with the non-TIM station detecting a SIG PHY preamble of the beacon (block 965). The SIG PHY preamble may include, depending on beacon configuration: a beacon indicator, a separate encoded block indicator, data duration information, TIM duration information, common data, a TIM bitmap, or a combination thereof. The non-TIM station may detect and decode the common data part of the beacon (block 967). However, since the non-TIM station does not generally need information in the TIM bitmap, the non-TIM station typically does not detect and decode the TIM part of the beacon. Although, in some example embodiments, the non-TIM station may periodically or occasionally detect and decode the TIM part of the beacon.

Figure 10:
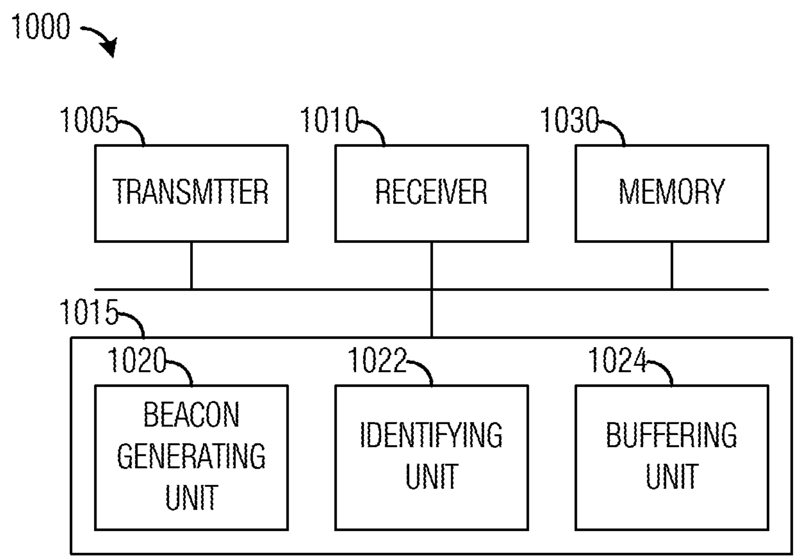
FIG. 10 illustrates an example first communications device according to example embodiments described herein.

FIG. 10 provides an illustration of a first communications device 1000. Communications device 1000 may be an implementation of a communications controller, such as an access point, a base station, an evolved NodeB, and the like. Communications device 1000 may be used to implement various ones of the embodiments discussed herein. As shown in FIG. 10, a transmitter 1005 is configured to send packets and/or signals and a receiver 1010 is configured to receive packets and/or signals. Transmitter 1005 and receiver 1010 may have a wireless interface, a wireline interface, or a combination thereof.

A beacon generating unit 1020 is configured to generate a beacon for use by TIM and non-TIM stations. Beacon generating unit 1020 is also configured to generate a TIM according to a TIM generating rule and stations that communications device 1000 is transmitting to. The beacon may include: a SIG PHY preamble, a common data portion, a TIM portion, or a combination thereof. The beacon may include indicators, duration information, block encoding information, or a combination thereof. An identifying unit 1022 is configured to identify stations that communications device 1000 is transmitting to. Identifying unit 1022 is configured to identify stations according to a selection criteria, such as fairness, priority, quality of service requirements, service history, subscriber level, and the like, network utilization, network load, availability of data, and the like. A buffering unit 1024 is configured to buffer data, such as downlink data and/or uplink data, received by communications device 1000. A memory 1030 is configured to store beacons, duration information, indicators, CRC, common data, TIM information, TIM bitmaps, data, identified stations, and so on.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, transmitter 1005 and receiver 1010 may be implemented as a specific hardware block, while beacon generating unit 1020, identifying unit 1022, and buffering unit 1024 may be software modules executing in a processor 1015, a microprocessor, a custom circuit, or a custom compiled logic array of a field programmable logic array. Beacon generating unit 1020, identifying unit 1022, and buffering unit 1024 may be stored as modules in memory 1030.

Figure 11:
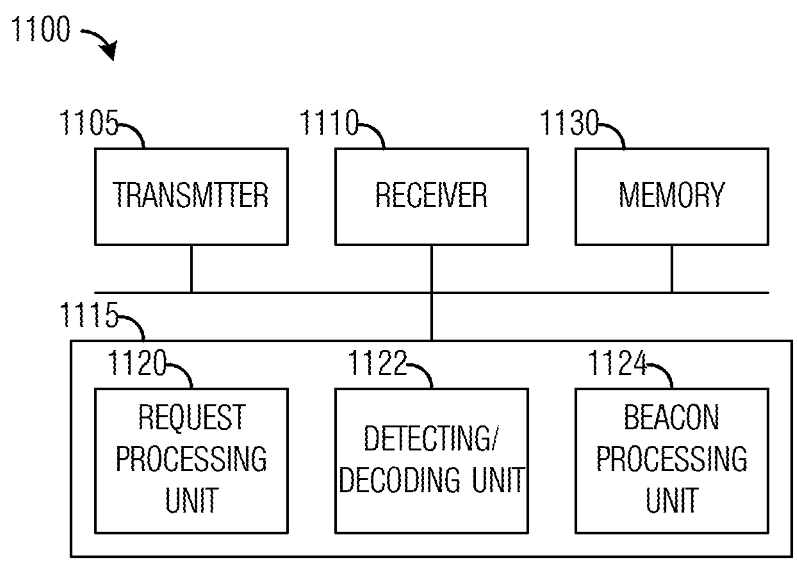
FIG. 11 illustrates an example second communications device according to example embodiments described herein.

FIG. 11 provides an illustration of a second communications device 1100. Communications device 1100 may be an implementation of a communications device, such as a station, a sensor, an offload device, a user equipment, and the like. Communications device 1100 may be used to implement various ones of the embodiments discussed herein. As shown in FIG. 11, a transmitter 1105 is configured to send packets and/or signals and a receiver 1110 is configured to receive packets and/or signals. Transmitter 1105 and receiver 1110 may have a wireless interface, a wireline interface, or a combination thereof.

A request processing unit 1120 is configured to generate a request for data, such as downlink data and/or uplink data, from a communications controller. The request for the data may be an explicit request or an implicit request. A detecting/decoding unit 1122 is configured to detect and/or decode transmissions. As an example, detecting/decoding unit 1122 detects and decodes a common data portion of a beacon, a TIM portion of the beacon, or both. A beacon processing unit 1124 is configured to process information included in the beacon, such as decoding a TIM. As an example, beacon processing unit 1124 processes the beacon to determine a duration of the common data portion, to determine if the common data portion and the TIM portion are separately encoded, and the like. Beacon processing unit 1124 utilizes a TIM generating rule as specified by an AP to decode a TIM. A memory 1130 is configured to store beacons, duration information, indicators, CRC, common data, TIM information, TIM bitmaps, and so on.

The elements of communications device 1100 may be implemented as specific hardware logic blocks. In an alternative, the elements of communications device 1100 may be implemented as software executing in a processor, controller, application specific integrated circuit, or so on. In yet another alternative, the elements of communications device 1100 may be implemented as a combination of software and/or hardware.

As an example, transmitter 1105 and receiver 1110 may be implemented as a specific hardware block, while request processing unit 1120, detecting/decoding unit 1122, and beacon processing unit 1124 may be software modules executing in a processor 1115, a microprocessor, a custom circuit, or a custom compiled logic array of a field programmable logic array. Request processing unit 1120, detecting/decoding unit 1122, and beacon processing unit 1124 may be stored as modules in memory 1130.

Although the present disclosure and its advantages have been described in detail, it should be understood that various changes, substitutions and alterations can be made herein without departing from the spirit and scope of the disclosure as defined by the appended claims.

What is claimed is:

1. A method for operating an access point, the method comprising:

identifying, by the access point, one or more stations to receive a first transmission from the access point;

generating, by the access point, a traffic indication map (TIM) for the one or more stations identified in the TIM in accordance with a TIM generating rule, the TIM generating rule identifying at least an offset length value indicating a number of bits used to represent an offset from a reference access identifier (AID) for unicast transmission to an AID for unicast transmission of one of the one or more stations, and identifying a number of station entries value, wherein the TIM includes an offset length field containing the offset length value, and a number of station entries field containing the number of station entries value; and broadcasting, by the access point, a beacon carrying the TIM to the one or more stations identified, the beacon decodable by the one or more stations according to the TIM generating rule, wherein the beacon comprises a preamble, a common data portion comprising common data, and a TIM portion comprising the TIM, wherein the common data portion and the TIM portion are at a same layer level, wherein the common data portion comprises first error check or correction bits for decoding the common data, wherein the TIM portion comprises second error check or correction bits for decoding the TIM, wherein the first error check or correction bits cannot decode the TIM, and wherein the second error check or correction bits cannot decode the common data.

2. The method of claim 1, wherein the TIM generating rule identifies a plurality of offsets.

3. The method of claim 1, wherein the TIM generating rule identifies an increment size, an initial offset, and a plurality of increments.

4. The method of claim 1, wherein the TIM generating rule identifies a bitmap size, a plurality of offsets, and a plurality of bitmaps.

5. The method of claim 1, wherein the one or more stations are identified by their address identifiers.

6. The method of claim 1, further comprising transmitting a second transmission to each of the one or more stations identified.

7. The method of claim 6, wherein transmitting the second transmission occurs in a single transmission opportunity.

8. The method of claim 1, wherein the preamble comprises a beacon indicator, common data duration information, and TIM duration information.

9. The method of claim 8, wherein the preamble comprises a separate block encoding indicator.

10. The method of claim 1, wherein the first error check or correction bits and the second error check or correction bits allow the common data portion and the TIM portion to be decoded separately.

11. The method of claim 1, wherein the preamble comprises a beacon indicator, and common data duration information.

12. The method of claim 11, wherein the common data portion comprises TIM duration information.

13. The method of claim 1, further comprising transmitting a TIM generating rule indicator.

14. The method of claim 13, wherein transmitting the TIM generating rule indicator occurs during station association.

15. The method of claim 13, wherein transmitting the TIM generating rule indicator occurs prior to broadcasting the beacon.

16. A method for operating a station, the method comprising:

receiving, by the station, a first beacon including a traffic indication map (TIM) from an access point, wherein the first beacon comprises a preamble, a common data portion comprising common data, and a TIM portion comprising the TIM, wherein the common data portion and the TIM portion are at a same layer level, wherein the common data portion comprises first error check or correction bits for decoding the common data, wherein the TIM portion comprises second error check or correction bits for decoding the TIM, wherein the first error check or correction bits cannot decode the TIM, and wherein the second error check or correction bits cannot decode the common data;

identifying, by the station, one or more stations to receive a first transmission from the access point from the TIM in accordance with a TIM generating rule identifying at least an offset length value indicating a number of bits used to represent an offset from a reference access identifier (AID) for unicast transmission to an AID for unicast transmission of one of the one or more stations, and identifying a number of station entries value, wherein the TIM includes an offset length field containing the offset length value, and a number of station entries field containing the number of station entries value;

determining, by the station, if the station is one of the one or more stations identified; and receiving, by the station, a second transmission from the access point if the station is one of the one or more stations identified.

17. The method of claim 16, wherein the TIM generating rule identifies a plurality of offsets.

18. The method of claim 16, wherein the TIM generating rule identifies an increment size, an initial offset, and a plurality of increments.

19. The method of claim 16, wherein the TIM generating rule identifies a bitmap size, a plurality of offsets, and a plurality of bitmaps.

20. The method of claim 16, wherein the one or more stations are identified by their address identifiers.

21. The method of claim 16, further comprising receiving a TIM generating rule indicator prior to receiving the first beacon.

22. The method of claim 21, wherein receiving the TIM generating rule indicator occurs during association of the station.

23. The method of claim 16, further comprising:

receiving a second beacon with a common data portion and a TIM portion;

determining if the station does not need to decode the TIM portion; and decoding only the common data portion if the station does not need to decode the TIM portion.

24. An access point comprising:

a processor configured to identify one or more stations to receive a first transmission from the access point, and to generate a traffic indication map (TIM) for the one or more stations identified, the TIM in accordance with a TIM generating rule identifying at least an offset length value indicating a number of bits used to represent an offset from a reference access identifier (AID) for unicast transmission to an AID for unicast transmission of one of the one or more stations, and identifying a number of station entries value, wherein the TIM includes an offset length field containing the offset length value, and a number of station entries field containing the number of station entries value; and a transmitter operatively coupled to the processor, the transmitter configured to broadcast a beacon carrying the TIM to the one or more stations identified, the beacon decodable by the one or more stations according to the TIM generating rule, wherein the beacon comprises a preamble, a common data portion comprising common data, and a TIM portion comprising the TIM, wherein the common data portion and the TIM portion are at a same layer level, wherein the common data portion comprises first error check or correction bits for decoding the common data, wherein the TIM portion comprises second error check or correction bits for decoding the TIM, wherein the first error check or correction bits cannot decode the TIM, and wherein the second error check or correction bits cannot decode the common data.

25. The access point of claim 24, wherein the transmitter is configured to transmit a second transmission to each of the one or more stations identified.

26. The access point of claim 25, wherein the transmitter is configured to transmit the second transmission to each of the one or more stations identified in a single transmission opportunity.

27. The access point of claim 24, wherein the transmitter is configured to transmit a TIM generating rule indicator.

28. The access point of claim 27, wherein the transmitter is configured to transmit the TIM generating rule indicator prior to broadcasting the beacon.

* * * * *